Figure 1:
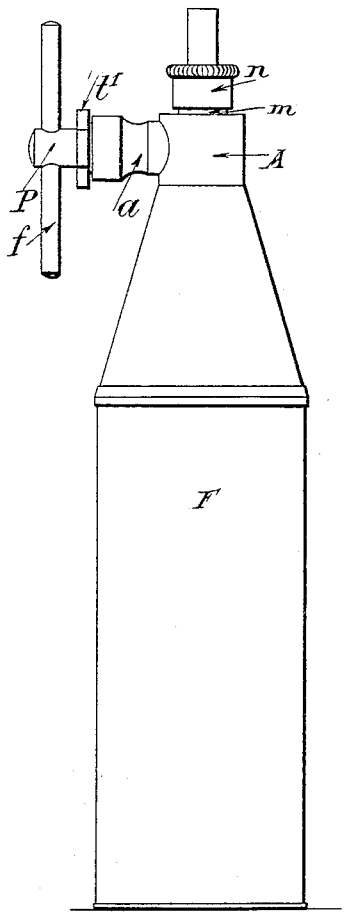

No. 620,535. Patented Feb. 28, 1899.
J. BENGUÉ.
COCK AND VALVE FOR BOTTLES, &c.
(Application filed Apr. 10, 1896.)

(No Model.) 3 Sheets—Sheet 1.

WITNESSES.
John Lotka
Fr. Hanaford

INVENTOR:
J Bengué
BY
Munn
ATTORNEYS.

No. 620,535. Patented Feb. 28, 1899.
J. BENGUÉ.
COCK AND VALVE FOR BOTTLES, &c.
(Application filed Apr. 10, 1898.)
(No Model.) 3 Sheets—Sheet 2.
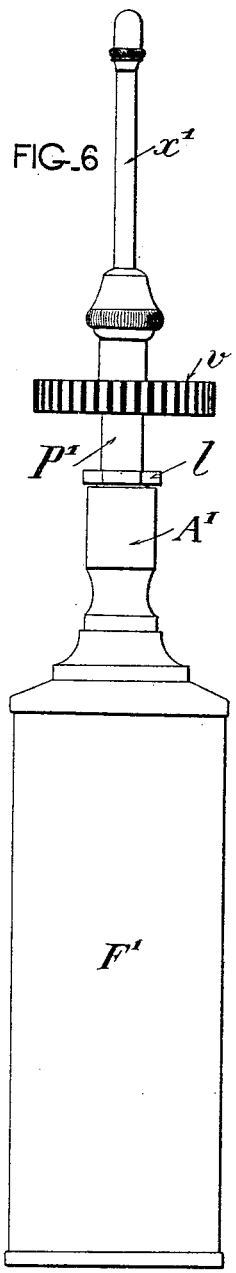
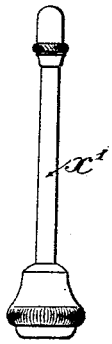
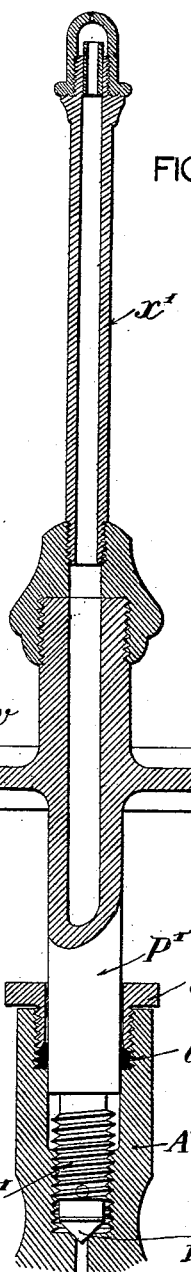
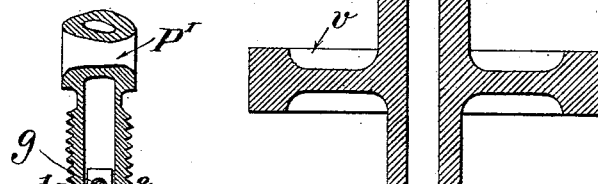
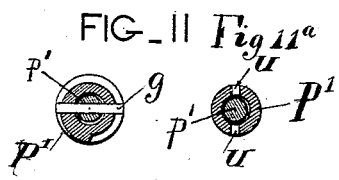
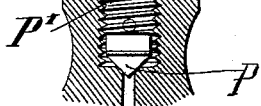
WITNESSES.
John Lotka
J. W. Hanaford
INVENTOR:
J. Bengué
BY
Munn
ATTORNEYS
THE NORRIS PETERS CO., PHOTO-LITHO., WASHINGTON, D. C.

No. 620,535. Patented Feb. 28, 1899.
J. BENGUÉ.
COCK AND VALVE FOR BOTTLES, &c.
(Application filed Apr. 10, 1896.)
(No Model.) 3 Sheets—Sheet 3.
FIG_12
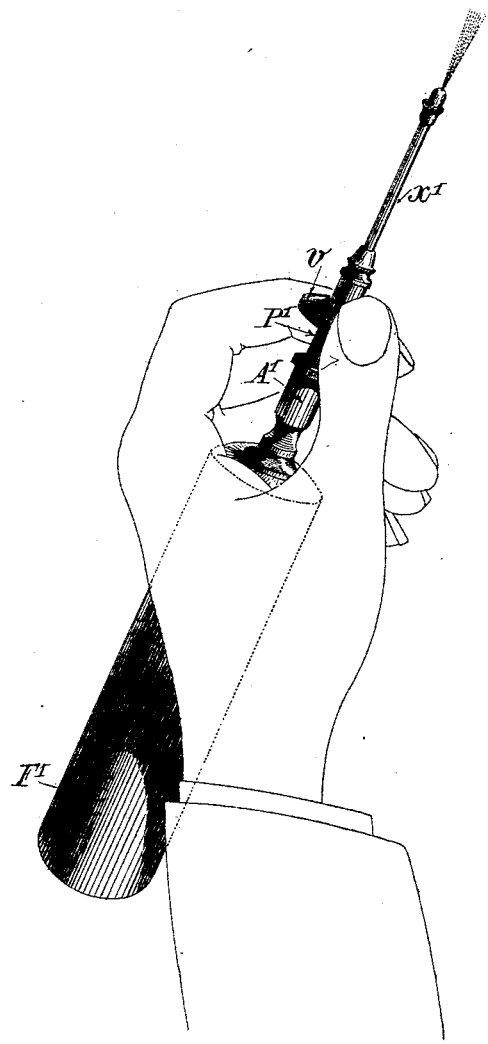
WITNESSES.
John Lotka
F M Hanaford
INVENTOR:
J Benqué
BY
ATTORNEYS

UNITED STATES PATENT OFFICE.

JULES BENGUÉ, OF PARIS, FRANCE.

COCK AND VALVE FOR BOTTLES, &c.

SPECIFICATION forming part of Letters Patent No. 620,535, dated February 28, 1899.

Application filed April 10, 1896. Serial No. 586,991. (No model.)

*To all whom it may concern:*

Be it known that I, JULES BENGUÉ, of Paris, France, have invented new and useful Improvements in and Relating to Cocks and Valves for Bottles and other Receptacles, of which the following is a full, clear, and exact description.

My invention relates to receptacles adapted to contain and spray liquids more or less volatile, and has for its objects to improve the construction of such receptacles, particularly in regard to the conical discharge-valve which controls the amount of liquid or vapor delivered in a spray.
The conical valve ordinarily used and controlled by a rotary motion is very effective in permitting of the very slight variations in the cross-sectional area of the discharge-opening. This valve, however, is open to the serious objection that it is liable to leak.

It will be understood that in order to effect a tight joint the conical point of the valve must be accurately and exactly concentric with the opening or seat adapted to receive it. This in practice involves very accurate work in the construction of the cock and the assembling of the parts thereof, and even then the desired result is but seldom accomplished. Moreover, since friction is scarcely ever uniform at all points of the periphery of the valve's point said point rapidly changes its forms by wear, and the tightness of the seating is then lost. These drawbacks are all due to the fact that the valve-point is rigidly mounted on the valve-stem, through the medium of which the point is adjusted to regulate the size of the outlet. To obviate these defects, I have materially changed the construction by movably attaching the conical point or valve proper on the stem which regulates the position of the said valve relatively to its seat. Owing to this movable arrangement the conical valve will automatically assume a position concentric and coaxial with the seat, thus insuring a uniform friction at all points, and consequently even wear. In consequence thereof I obtain a perfectly tight joint, which also remains tight at all times irrespectively of the wear of the valve.
The particular construction whereby I obtain the above-indicated objects will be fully described with reference to the accompanying drawings, and the features of novelty will be pointed out in the appended claims.

Figures 1 to 5 represent one form of construction embodying my improvements, and Figs. 6 to 12 illustrate an atomizer likewise constructed according to my invention.

Figure 2:
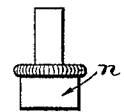
Figure 3:
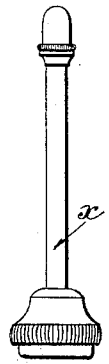
Figure 4:
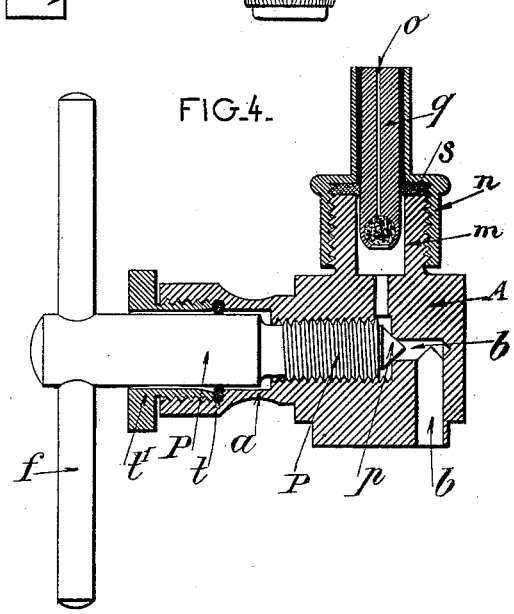
Figure 5:
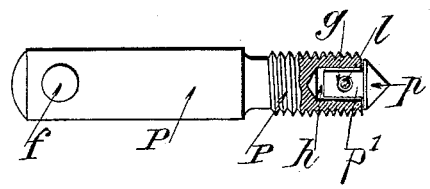

Fig. 1 is an elevation of a receptacle having a laterally-arranged valve or cock constructed according to my invention. Fig. 2 is a separate elevation of the spraying-cap employed in connection with said receptacle. Fig. 3 is an elevation of a spraying-tube which may be used instead of the cap shown in Fig. 2. Fig. 4 is a sectional elevation, on an enlarged scale, of the valve shown in Fig. 1. Fig. 5 is a plan view, with parts in section, of the valve proper and its stem. Fig. 6 is an elevation of an atomizer adapted to be held in the hand and provided with a cock or valve arranged vertically and substantially in the axis of the atomizer. Fig. 7 is a side elevation of the spraying-tube of the said atomizer. Fig. 8 is a side elevation of a spraying-cap which may be used in lieu of said spraying-tube. Fig. 9 is a longitudinal sectional elevation, on an enlarged scale, of the valve employed in connection with the atomizer shown in Fig. 6. Fig. 10 is a broken view, with parts in section, showing the valve proper and its connection with the stem. Figs. 11 and 11$^a$ are sectional plans of the valve and its stem on the lines 1 2 and 3 4, respectively, of Fig. 10; and Fig. 12 is a perspective view showing how the valve may be controlled with the same hand which holds the atomizer.

Like letters of reference indicate corresponding parts in all the views.

In each of the constructions shown my improved valve comprises a casing made of bronze or other suitable material and adapted to be secured to the receptacle and a stem longitudinally movable in said casing and compelling the valve proper to move longitudinally, while allowing said valve to move laterally, so that it may always center itself.

As illustrated in Figs. 1 to 5, the stem P is arranged laterally and screws into a female-threaded bore of the casing A, which is secured to the neck of the receptacle F. The free end of the stem P projects through the horizontal outlet end $a$ of the casing A and is provided with a handle $f$, which permits of turning the stem to move the same with the valve $p$ inwardly or outwardly in a horizontal direction.

The casing A is provided with a bore $b$, communicating with the interior of the receptacle F and having at its upper end a horizontal continuation $b'$ leading to the seat of the conical valve proper, $p$, it being understood that the axis of this horizontal portion or that of the seat coincides with the longitudinal axis of the valve-stem P.

The movable valve $p$ is preferably made of steel and consists of a head $p$, of true conical shape, and a shank $p'$, provided with a transverse aperture $g$ and fitting into a cylindrical recess $h$ at the inner end of the valve-stem P. The recess is of somewhat greater diameter than the shank $p'$, so that said shank has some play within the recess, and a pin $l$ is secured to the stem P and passed through the aperture $g$ of the shank $p'$, sufficient play being given to the shank on said pin to allow the head or valve $p$ to move transversely in relation to the stem P. By this construction the head or valve $p$ will be allowed to adjust itself relatively to the seat at the end of the bore $b'$, as said valve is capable of a limited independent movement both longitudinally and transversely of the valve-stem P. The pin $l$ forms a guide for the valve $p$, allowing the same to move transversely, but holding it against longitudinal movement relatively to the stem P.

In order to make the stem fit tightly into the neck $a$ of the casing A, I provide a rubber washer $t$, which is compressed between a shoulder in the neck $a$ and a sleeve $t'$, screwing into said neck.

The casing A is provided with a vertical tube $m$, in which is screwed a discharge-nozzle, which may be either in the shape of a cap, as shown in Fig. 2, or of a tube, as shown in Fig. 3, or any other approved construction of the discharge-nozzle may be used.

To produce a very narrow capillary spray or jet, I screw a cap $n$ upon the tube $m$. This cap has a tubular end, into which fits a glass tube $q$, having a capillary bore $o$, whose inner end is enlarged to form a funnel-shaped receptacle, in which I place cotton or other suitable material, serving as a filter and preventing the bore $o$ from becoming obstructed. A washer $s$ is placed between the cap $n$ and the tube $m$ to insure a tight joint. The receptacle formed at the inner end of the capillary bore $o$ is made with a contracted mouth or inlet, so that the filtering material will be held in said enlarged end or chamber without the use of any additional support.

When it is desired to spray the liquid in a vaporized or atomized condition, I substitute for the cap $n$ the tube $x$, (shown in Fig. 3,) which may be straight, as shown, or curved, if preferred.

In Figs. 6 to 12 the valve-casing A' has its bore arranged vertically—that is, its axis coincides with the longitudinal axis of the receptacle F'. Said casing A' is screw-threaded interiorly at different points, the thread of smaller diameter receiving the end of the valve-stem P', while the screw-thread of larger diameter receives the screw-threaded sleeve $l$ and the packing $l'$. The connection of the valve-stem P' with the valve proper, $p$, is the same as hereinbefore described. The valve-stem, however, is tubular and has at its inner end lateral apertures $u$, located directly above the head of the valve proper, $p$. On the stem P' is also secured a milled disk or wheel $v$, by means of which the stem P' may be turned so as to adjust the valve $p$ relatively to its seat. As illustrated in Fig. 12, the wheel $v$ may be manipulated with the same hand that holds the receptacle F'. The upper or outer end of the stem P' is screw-threaded to receive either a discharge-tube $x'$ to atomize the liquid or a cap $n'$, constructed like the cap $n$, (shown in Fig. 4,) it being understood that when said cap is employed I also provide a washer corresponding to that lettered $s$ in Fig. 4.

The apparatus constructed according to my invention are practically air and water tight and will remain so for an indefinite length of time. They also permit of ejecting the liquid either in the shape of a capillary jet or of an atomized spray. I intend to employ the apparatus principally for medical uses, such as spraying ethyl chlorid or methyl chlorid.

Having thus described my invention, I claim as new and desire to secure by Letters Patent—

1. In an atomizer or the like, a discharge-nozzle the same comprising a tubular cap provided with a discharge-tube having a capillary bore enlarged at its inner end, said enlarged end being of smaller diameter at its mouth or inlet than its upper or inner portion thereby forming a chamber with a contracted mouth adapted to prevent the escape of an article inserted in said chamber, and a filter located in said enlarged end, substantially as described.

2. The combination of the longitudinally-movable valve-stem, the conical valve movable transversely on said stem, the valve-casing having an apertured seat for said valve, the outlet-tube connected to said casing and having a capillary bore enlarged at its inner end, substantially as described.

In witness whereof I have hereunto set my hand in presence of two witnesses.
JULES BENGUÉ.

Witnesses:
M. TOUARD,
CLYDE SHROPSHIRE.